(12) United States Patent
Shi et al.

(10) Patent No.: US 12,152,104 B2
(45) Date of Patent: Nov. 26, 2024

(54) POLYETHER POLYMERIZATION PROCESS

(71) Applicant: Dow Global Technologies LLC, Midland, MI (US)

(72) Inventors: Haifeng Shi, Manvel, TX (US); Mrunmayi Kumbhalkar, Midland, MI (US); Jason S. Fisk, Midland, MI (US); Curtis M. Whaley, Midland, MI (US); David A. Babb, Lake Jackson, TX (US); Brian J. Murdoch, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 688 days.

(21) Appl. No.: 17/433,917

(22) PCT Filed: Feb. 17, 2020

(86) PCT No.: PCT/US2020/018501
§ 371 (c)(1),
(2) Date: Aug. 25, 2021

(87) PCT Pub. No.: WO2020/176278
PCT Pub. Date: Sep. 3, 2020

(65) Prior Publication Data
US 2022/0049052 A1    Feb. 17, 2022

Related U.S. Application Data

(60) Provisional application No. 62/812,151, filed on Feb. 28, 2019.

(51) Int. Cl.
*C08G 65/26* (2006.01)

(52) U.S. Cl.
CPC ..... *C08G 65/2606* (2013.01); *C08G 65/2663* (2013.01); *C08G 65/269* (2013.01); *C08G 65/2696* (2013.01)

(58) Field of Classification Search
CPC ............ C08G 65/2606; C08G 65/2663; C08G 65/269; C08G 65/2696
See application file for complete search history.

(56) References Cited

U.S. PATENT DOCUMENTS

| 9,040,657 | B2 | 5/2015 | Laitar | |
|---|---|---|---|---|
| 2004/0102314 | A1 | 5/2004 | Le-Khac | |
| 2017/0305826 | A1* | 10/2017 | Uthe | C08G 65/2669 |

FOREIGN PATENT DOCUMENTS

| WO | 01/003831 A | 1/2001 |
|---|---|---|
| WO | 2012/091968 A | 7/2012 |
| WO | 2018/209069 A | 11/2018 |
| WO | 2018/209075 A | 11/2018 |

* cited by examiner

*Primary Examiner* — Rabon A Sergent

(57) ABSTRACT

Polyethers are prepared by polymerizing an alkylene oxide in the presence of a double metal cyanide catalyst complex and certain $M^5$ metal or semi-metal compounds. The double metal cyanide catalyst complex contains 0.5 to 2 weight percent potassium. The ability of this catalyst system to tolerate such high amounts of potassium permits the catalyst preparation procedure to be simplified and less expensive.

8 Claims, No Drawings

POLYETHER POLYMERIZATION PROCESS

This invention relates to processes for polymerizing alkylene oxides to form polyethers.

Double metal cyanide (DMC) catalysts are becoming increasingly important polymerization catalysts, especially for polymerizing propylene oxide to form polyethers. The advantages of these catalysts are well established. They do not strongly catalyze a rearrangement of propylene oxide to form propenyl alcohol. Polyether polyols made using DMC catalysts therefore tend to have lower quantities of unwanted monofunctional polymers. In addition, DMC catalyst residues usually do not need to be removed from the product. Neutralization and catalyst removal steps that are needed when alkali metal catalysts are used can be avoided.

DMC catalysts are made in an aqueous precipitation process in which water-soluble starting materials are brought together in aqueous solution, where they react to produce an insoluble catalyst complex. The starting materials are generally a metal chloride salt such as $ZnCl_2$ and an alkali metal cyanometallate compound, of which potassium hexacyanocobaltate is most commonly used. The catalyst-forming reaction therefore produces chloride and/or alkali metal-containing by-products.

The by-products, especially those containing alkali metals, have a strong adverse effect on catalyst performance. Hence, the catalyst preparation process commonly includes multiple washing steps to remove alkali metals to very low levels in the catalyst. These washing steps increase process time and catalyst cost. It would be desirable to simplify the catalyst production process and make it less expensive.

U.S. Pat. No. 9,040,657 and WO 2018/209069 disclose combinations of a DMC catalyst and certain metal-containing additives as alkylene oxide polymerization catalysts. This technology is very effective in reducing the activation time and in improving the catalyst performance when exposed to high concentrations of hydroxyl groups. The additive may be added to the previously-produced DMC catalyst or may be added into or produced in the DMC catalyst precipitation step or one or more of the washing steps. In the latter case, the catalyst complex so formed is washed repeatedly prior to use.

This invention is a method for producing a polyether, the method comprising
I. forming a reaction mixture comprising a) a hydroxyl-containing starter, b) at least one alkylene oxide, c) a water insoluble polymerization catalyst complex that includes at least one double metal cyanide compound and d), as part of the water insoluble polymerization catalyst complex or as a separate component, at least one $M^5$ metal or semi-metal compound, in which the $M^5$ metal or semi-metal is selected from aluminum, magnesium, manganese, scandium, molybdenum, cobalt, tungsten, iron, vanadium, tin, titanium, silicon and zinc, and is bonded to at least one alkoxide, aryloxy, carboxylate, acyl, pyrophosphate, phosphate, thiophosphate, dithiophosphate, phosphate ester, thiophosphate ester, amide, oxide, siloxide, hydride, carbamate, halide or hydrocarbon anion, and
II. polymerizing the alkylene oxide onto the hydroxyl-containing starter in the presence of the water insoluble polymerization catalyst complex and the $M^5$ metal or semi-metal compound to produce the polyether,
wherein the water insoluble polymerization catalyst complex contains 0.5 to 2 weight percent potassium, based on the weight of the water insoluble polymerization catalyst complex.

With this invention, high levels of potassium can be tolerated in the double metal cyanide catalyst. This is an unexpected benefit of significance. Because good catalyst activity is experienced despite the presence of significant amounts of potassium, catalyst preparation steps that remove potassium from the catalyst complex can be reduced or even eliminated. In particular, washing steps can be reduced, often to zero or only one, thereby reducing the cost and complexity of catalyst preparation.

Polyethers are prepared according to the invention in a process that comprises: (1) combining the catalyst complex and $M^5$ metal or semi-metal compound with a hydroxyl-containing starter compound and an alkylene oxide to form a polymerization mixture, and (2) subjecting the polymerization mixture to polymerization conditions.

The polymerization in some embodiments is performed in the presence of no more than 0.01 mole of a carbonate precursor per mole of alkylene oxide that is polymerized. A "carbonate precursor" is a compound that gives rise to carbonate (—O—C(O)—O—) linkages when copolymerized with an alkylene oxide. Examples of carbonate precursors include carbon dioxide, linear carbonates, cyclic carbonates, phosgene and the like. The polymerization in some embodiments is performed in the presence of no more than 0.001 mole of a carbonate precursor or no more than 0.0001 mole of a carbonate precursor, per mole of alkylene oxide that is polymerized. The carbonate precursor may be absent entirely. Accordingly, the polyether formed in such embodiments of the process has few if any carbonate linkages. The polyether formed in such embodiments of the process may have up to 0.5 weight % $CO_2$ in the form of carbonate linkages. It may contain no more than 0.1 weight % of such $CO_2$ or may contain no more than 0.01 weight % of such $CO_2$. It may contain no such $CO_2$.

The main functions of the starter compound are to provide molecular weight control and to establish the number of hydroxyl groups that the polyether product will have. A hydroxyl-containing starter compound may contain 1 or more (e.g., 2 or more) hydroxyl groups and as many as 12 or more hydroxyl groups. For example, starters for producing polyols for use in polyurethane applications usually have 2 to 8 hydroxyl groups per molecule. In some embodiments, the starter compound will have 2 to 4 or 2 to 3 hydroxyl groups. In other embodiments, the starter compound will have 4 to 8 or 4 to 6 hydroxyl groups. The starter compound may have at least two hydroxyl groups that are in the 1,2- or 1,3-positions with respect to each other (taking the carbon atom to which one of the hydroxyl groups is bonded as the "1" position). Mixtures of starter compounds can be used.

The starter compound will have a hydroxyl equivalent weight less than that of the monol or polyol product. It may have a hydroxyl equivalent weight of 30 to 500 or more. The equivalent weight may be up to 500, up to 250, up to 125, and/or up to 100.

Exemplary starters include, but are not limited to, ethylene glycol, diethylene glycol, triethylene glycol, propylene glycol, dipropylene glycol, tripropylene glycol, 1,4-butane diol, 1,6-hexane diol, 1,8-octane diol, cyclohexane dimethanol, glycerin, trimethylolpropane, trimethylolethane, pentaerythritol, sorbitol, sucrose, phenol and polyphenolic starters such as bisphenol A or 1,1,1-tris(hydroxyphenyl)ethane, and alkoxylates (such as ethoxylates and/or propoxylates) of any of these. The starter compound can also be water. The starter may be neutralized with or contain a small amount of an acid, particularly if the starter is prepared in the presence of a base (as is often the case with glycerin). If an acid is present, it may be present in an amount of from about 10 to 100 ppm, based on the weight of the starter, e.g., as described in U.S. Pat. No. 6,077,978. The acid may be used in somewhat larger amounts, such as from 100 to 1000 ppm, based on the weight of the starter, as described in U.S. Patent Publication Application No. 2005-0209438. The acid may be added to the starter before or after the starter is combined with the catalyst complex.

Certain starters may provide specific advantages. Triethylene glycol has been found to be an especially good starter for use in batch and semi-batch processes for producing polyether diols. Tripropylene glycol and dipropylene glycol also have been found to be especially good starters for use in conjunction with the catalyst complex of the invention.

The alkylene oxide may be, e.g., ethylene oxide, 1,2-propylene oxide, 1,2-butane oxide, 2-methyl-1,2-butaneoxide, 2,3-butane oxide, tetrahydrofuran, epichlorohydrin, hexane oxide, styrene oxide, cyclohexene oxide, divinylbenzene dioxide, a glycidyl ether such as bisphenol A diglycidyl ether, allyl glycidyl ether, or other polymerizable oxirane. The preferred alkylene oxide is 1,2-propylene oxide, or a mixture of at least 40% (preferably at least 80%) by weight propylene oxide and correspondingly up to 60% by weight (preferably up to 20%) ethylene oxide.

The polymerization typically is performed at an elevated temperature. The polymerization mixture temperature may be, for example, 70° C. to 220° C. (e.g., 120° C. to 190° C.).

The polymerization reaction usually may be performed at a superatmospheric pressure, but can be performed at atmospheric pressure or even a subatmospheric pressure. A preferred pressure is 0 to 10 atmospheres, especially 0 to 6 atmospheres, gauge pressure.

The polymerization preferably is performed under vacuum or under an inert atmosphere such as a nitrogen, helium or argon atmosphere. Carbon dioxide is either absent or present in at most an amount as indicated above with regard to carbonate precursors.

The polymerization reaction may be performed in any type of vessel that is suitable for the pressures and temperatures encountered. In a continuous or semi-batch process, the vessel should have one or more inlets through which the alkylene oxide and additional starter compound and catalyst complex can be introduced during the reaction. In a continuous process, the reactor vessel should additionally contain at least one outlet through which a portion of the partially polymerized reaction mixture can be withdrawn. In a semi-batch operation, alkylene oxide (and optionally additional starter and catalyst complex) is added during the reaction, but product usually is not removed until the polymerization is completed. A tubular reactor that has multiple points for injecting the starting materials, a loop reactor, and a continuous stirred tank reactor (CTSR) are all suitable types of vessels for continuous or semi-batch operations. The reactor should be equipped with a means of providing or removing heat so the temperature of the reaction mixture can be maintained within a suitable range. Suitable means include various types of jacketing for thermal fluids, various types of internal or external heaters, and the like. A cookdown step performed on continuously withdrawn product is conveniently conducted in a reactor that prevents significant back-mixing from occurring. Plug flow operation in a pipe or tubular reactor is a preferred manner of performing such a cook-down step.

The product obtained in any of the foregoing processes may contain up to 0.5% by weight, based on the total weight, of unreacted alkylene oxide; small quantities of the starter compound and low molecular weight alkoxylates thereof; and small quantities of other organic impurities and water. Volatile impurities should be flashed or stripped from the resultant monol or polyol. The product typically contains catalyst residues. It is typical to leave these residues in the product, but these can be removed if desired. Moisture and volatiles can be removed by stripping the polyol.

The polymerization reaction can be characterized by the "build ratio", which is defined as the ratio of the number average molecular weight of the product to that of the starter compound. This build ratio may be as high as 160, but is more commonly in the range of from 2.5 to about 65 and still more commonly in the range of 2.5 to about 50, 2.5 to 35, 2.5 to 11 or 7 to 11.

The invention is particularly useful in polymerization processes characterized by one or more of the following: i) the use of a starter having an equivalent weight of up to 125, especially up to 100 or up to 75; ii) a hydroxyl content of 4.25 to 20 wt. %, especially 4.25 to 15 wt. %, based on the total weight of the reaction mixture, during at least a portion of the polymerization process, and iii) in cases in which the double metal cyanide catalyst complex includes a metal hexacyanocobaltate, a concentration of catalyst complex sufficient to provide at most 5 ppm of cobalt, especially 0.5 to 2 ppm, based on the weight of the product. Each of these represents a severe condition in which conventional zinc hexacyanometallate catalysts by themselves perform poorly.

Enough of the water insoluble polymerization catalyst complex may be used to provide a reasonable polymerization rate, but it is generally desirable to use as little of the catalyst complex as possible consistent with reasonable polymerization rates, as this both reduces the cost for the catalyst and, if the catalyst levels are low enough, can eliminate the need to remove catalyst residues from the product. Using lower amounts of catalyst complex also reduces the residual metal content of the product. The amount of catalyst complex may be from 1 to 5000 ppm based on the weight of the product. The amount of catalyst complex may be at least 2 ppm, at least 5 ppm, at least 10 ppm, at least 25 ppm, or up to 500 ppm or up to 200 ppm or up to 100 ppm, based on the weight of the product. In the case in which component (d) (i.e., the $M^5$ metal or semi-metal compound) forms part of the catalyst complex, the foregoing amounts include the weight of the $M^5$ metal or semi-metal compound that forms part of the catalyst complex. The foregoing amounts do not include any $M^5$ metal or semi-metal compound provided as a separate component. When the double metal cyanide includes a zinc hexacyanocobaltate, the amount of catalyst complex may be selected to provide 0.25 to 20, 0.5 to 10, 0.5 to 5 or 0.5 to 2.5 parts by weight cobalt per million parts by weight of the product.

In certain embodiments, the $M^5$ metal or semi-metal compound is present in an amount to provide 0.002 to 10 moles of $M^5$ metal or semi-metal per mole of hexacyanometallate. In some embodiments, the mole ratio of $M^5$ metal or semi-metal compound per mole of hexacyanometallate is 0.05 to 10, 0.1 to 5, 0.1 to 2, or 0.25 to 1.

The $M^5$ metal or semi-metal compound may be present in the form of particles having a surface area of at least 1 $m^2/g$ as measured using gas sorption methods. The surface area of such $M^5$ metal or semi-metal compound particles may be at least 10 $m^2/g$ or at least 100 $m^2/g$, and may be up to, for example, 300 $m^3/g$ or more. Their volume average particle size may be 100 μm or smaller, 25 μm or smaller, 1 μm or smaller or 500 nm or smaller. Such physical admixtures of the polymerization catalyst complex and $M^5$ metal or semi-metal compound particles can be made by, for example, forming solid particles of the zinc hexacyanocobaltate and combining them with the $M^5$ metal or semi-metal compound particles. This can be done at any stage of the catalyst preparation process after the double metal cyanide has precipitated. For example, the $M^5$ metal or semi-metal compound can be combined with the polymerization catalyst complex during any such washing step.

The water insoluble polymerization catalyst complex is made in a process that includes a precipitation step in which the double metal cyanide compound is formed from water-soluble precursor materials. In some embodiments, some or all of the $M^5$ metal or semi-metal compound forms part of the water insoluble polymerization catalyst complex. For purposes of this invention, the $M^5$ metal or semi-metal compound is considered to form part of the water insoluble polymerization complex if the $M^5$ metal or semi-metal compound, or $M^5$ metal- or semi-metal-containing precursor thereto, is present during the precipitation step in which the double metal cyanide compound is formed. Conversely, the $M^5$ metal or semi-metal compound is not considered as part of the water insoluble polymerization catalyst complex if such compound or $M^5$ metal- or semi-metal-containing precursor thereto is not present during that precipitation step. In the latter case, the $M^5$ metal or semi-metal compound can be added to the water insoluble polymerization catalyst complex after the precipitation step, such as during one or more subsequent washing steps or even after the synthesis of the polymerization catalyst complex is complete. For example, the $M^5$ metal or semi-metal compound can be added as a separate component into the polymerization process of the invention.

Methods for producing DMC catalyst as described, e.g., in U.S. Pat. Nos. 3,278,457, 3,278,458, 3,278,459, 3,404,109, 3,427,256, 3,427,334, 3,427,335, and 5,470,813. These methods typically include forming a starting solution containing an $M^1$ metal (as defined below) compound and a potassium cyanometallate compound, and reacting the $M^1$ metal compound and cyanometallate compound to produce the double metal cyanide catalyst, which precipitates from solution.

The solvent includes water and optionally a liquid aliphatic alcohol. The liquid aliphatic alcohol may be, for example, one or more of n-propanol, isopropanol, n-butanol, sec-butanol, t-butanol, other alkylene monoalcohol having up to, for example, 12 carbon atoms, ethylene glycol, diethylene glycol, triethylene glycol, propylene glycol, dipropylene glycol, tripropylene glycol, or other polyether having one or more hydroxyl groups and a molecular weight of up to, for example, 8000 g/mol. Aliphatic monoalcohols having 3 to 6 carbon atoms, especially t-butanol, are preferred among these. Especially preferred is a mixture of water and a liquid aliphatic alcohol that is soluble in water at the relative proportions present in the mixture (especially an aliphatic monoalcohol having 3 to 6 carbon atoms and most preferably t-butanol), in a volume ratio of 25:75 to 90:10.

The starting solution is conveniently formed by forming separate solutions of the starting cyanometallate compound and the $M^1$ metal compound and combining them. The combining of the starting solution should be accompanied by mixing. It is generally preferred to mix the cyanometallate compound solution into the solution of the $M^1$ metal compound, preferably by gradually adding the cyanometallate compound solution so the $M^1$ metal compound is always present in excess.

It is preferred to provide an excess of the $M^1$ metal compound over the cyanometallate compound. In some embodiments, the mole ratio of $M^1$ metal compound to cyanometallate compound is at least 2:1, preferably at least 3:1 or at least 5:1. This ratio may be, for example, up to 20:1 or up to 15:1.

The cyanometallate compound and $M^1$ metal compound react to form a catalyst complex that includes a water-insoluble $M^1$ metal cyanometallate. This reaction proceeds spontaneously at temperatures around room temperature (23° C.) or slightly elevated temperatures. Therefore, no special reaction conditions are needed. The temperature may be, for example, from 0 to 60° C. A preferred temperature is 20 to 50° C. or 25 to 45° C. It is preferred to continue agitation until precipitation takes place, which is generally indicated by a change of appearance in the solution. The reaction pressure is not especially critical so long as the solvent does not boil off. An absolute pressure of 10 to 10,000 kPa can be used, with an absolute pressure of 50 to 250 kPa being entirely suitable. The reaction time may be from 30 minutes to 24 hours or more.

It is preferred to treat the precipitated catalyst with a complexing agent. This is conveniently done by washing the precipitated catalyst one or more times with a complexing agent or solution of the complexing agent in water. The complexing agent component may include at least one of an alcohol as described before with regard to the starting solution, a polyether, a polyester, a polycarbonate, a glycidyl ether, a glycoside, a polyhydric alcohol carboxylate, a polyalkylene glycol sorbitan ester, a bile acid or salt, a carboxylic acid ester or amide thereof, cyclodextrin, an organic phosphate, a phosphite, a phosphonate, a phosphonite, a phosphinate, a phosphinite, an ionic surface- or interface-active compound, and/or an α,β-unsaturated carboxylic acid ester. In exemplary embodiments, the organic complex agent is one or more of n-propanol, isopropanol, n-butanol, sec-butanol, t-butanol, other alkylene monoalcohol having up to 12 carbon atoms, ethylene glycol, diethylene glycol, triethylene glycol, propylene glycol, dipropylene glycol, tripropylene glycol, or other polyether having one or more hydroxyl groups and a molecular weight of up to, for example, 8000 g/mol.

The catalyst complex so made is conveniently recovered from the starting solution or any wash liquid, dried and ground or milled if desired to reduce the catalyst complex to a powder having a volume average particle size of, for example, 100 μm or smaller. Drying can be performed by heating and/or applying vacuum.

The $M^1$ metal compound preferably is water-soluble. It is typically a salt of an $M^1$ metal and one or more anions. Such a salt may have the formula $M^1_x A^1_y$, wherein x, $A^1$ and y are as described below. Suitable anions $A^1$ include, but are not limited to, halides such as chloride, bromide and iodide, nitrate, sulfate, carbonate, cyanide, oxalate, thiocyanate, isocyanate, perchlorate, isothiocyanate, an alkanesulfonate such as methanesulfonate, an arylenesulfonate such as p-toluenesulfonate, trifluoromethanesulfonate (triflate), and a $C_{1-4}$ carboxylate. In exemplary embodiments, the anion $A^1$ is not any of alkoxide, aryloxy, carboxylate, acyl, pyrophosphate, phosphate, thiophosphate, dithiophosphate, phosphate ester, thiophosphate ester, amide, oxide, siloxide, hydride, carbamate or hydrocarbon anion. The $M^1$ metal is one or more of $Zn^{2+}$, $Fe^{2+}$, $Co^{+2+}$, $Ni^{2+}$, $Mo^{4+}$, $Mo^{6+}$, $Al^{+3+}$, $V^{4+}$, $V^{5+}$, $Sr^{2+}$, $W^{4+}$, $W^{6+}$, $Mn^{2+}$, $Sn^{2+}$, $Sn^{4+}$, $Pb^{2+}$, $Cu^{2+}$, $La^{3+}$, and $Cr^{3+}$. $Zn^{2+}$ is the preferred $M^1$ metal. $ZnCl_2$ is a preferred $M^1$ metal compound.

The cyanometallate compound includes an $M^2(CN)_r(X^1)_t$ anion, where r, $X^1$ and t are as described below. r is preferably 6 and t is preferably zero. The $M^2$ metal is one or more of $Fe^{3+}$, $Fe^{2+}$, $Co^{3+}$, $Co^{2+}$, $Cr^{2+}$, $Cr^{3+}$, $Mn^{2+}$, $Mn^{3+}$, Ir$^{3+}$, Ni$^{2+}$, Rh$_{3+}$, Ru$^{2+}$, V$^{4+}$, V$^{5+}$, Ni$^{2+}$, Pd$^{2+}$, and Pt$^{2+}$. The M$^2$ metal preferably is Fe$^{3+}$ or Co$^{3+}$, with Co$^{3+}$ being especially preferred. Potassium hexacyanocobaltate is a particularly preferred cyanometallate compound.

The double metal cyanide in some embodiments of the invention has the formula:

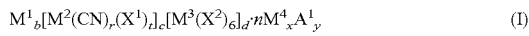

$$M^1{}_b[M^2(CN)_r(X^1)_t]_c[M^3(X^2)_6]_d \cdot nM^4{}_xA^1{}_y \qquad (I)$$

wherein:
  M$^1$ and M$^4$ each represent a metal ion independently selected from Zn$^{2+}$, Fe$^{2+}$, Co$^{+2+}$, Ni$^{2+}$, Mo$^{4+}$, Mo$^{6+}$, Al$^{+3+}$, V$^{4+}$, V$^{5+}$, Sr$^{2+}$, W$^{4+}$, W$^{6+}$, Mn$^{2+}$, Sn$^{2+}$, Sn$^{4+}$, Pb$^{2+}$, Cu$^{2+}$, La$^{3+}$, and Cr$^{3+}$;
  M$^2$ and M$^3$ each represent a metal ion independently selected from Fe$^{3+}$, Fe$^{2+}$, Co$^{3+}$, Co$^{2+}$, Cr$^{2+}$, Cr$^{3+}$, Mn$^{2+}$, Mn$^{3+}$, Ir$^{3+}$, Ni$^{2+}$, Rh$^{3+}$, Ru$^{2+}$, V$^{4+}$, V$^{5+}$, Ni$^{2+}$, Pd$^{2+}$, and Pt$^{2+}$;
  X$^1$ represents a group other than cyanide that coordinates with the M$^2$ ion;
  X$^2$ represents a group other than cyanide that coordinates with the M$^3$ ion;
  A$^1$ represents a halide, nitrate, sulfate, carbonate, cyanide, oxalate, thiocyanate, isocyanate, perchlorate, isothiocyanate, an alkanesulfonate, an arylenesulfonate, trifluoromethanesulfonate, or a C$_{1-4}$ carboxylate;
  b, c and d are each numbers that reflect an electrostatically neutral complex, provided that
  b and c each are greater than zero;
  x and y are integers that balance the charges in the metal salt M$^4{}_xA^1{}_y$;
  r is an integer from 4 to 6;
  t is an integer from 0 to 2; and
  n is a number from 0 and 20.

M$^1$ and M$^4$ each most preferably are zinc. M$^2$ and M$^3$ each most preferably are iron and cobalt, especially cobalt. r is most preferably 6 and t is most preferably zero. d is most preferably 0-1. The mole ratio of M$^1$ and M$^4$ metals combined to M$^2$ and M$^3$ metals combined is preferably 0.8:1 to 20:1. Zinc hexacyanocobaltate is most preferred.

The foregoing precipitation method can be adapted by incorporating the M$^5$ metal or semi-metal compound or M$^5$ metal- or semi-metal-containing precursor thereto, into the starting solutions. The M$^5$ metal or semi-metal compound is conveniently added to one or the other of these separate solutions, preferably the M$^1$ metal solution. The starting solution may contain, prior to reaction, 0.002 to 10 moles of the M$^5$ metal or semi-metal compound per mole of cyanometallate compound. In some embodiments, the amount of the M$^5$ metal or semi-metal compound is 0.05 to 10 moles, 0.1 to 5 moles, 0.1 to 2 moles, or 0.25 to 1 mole per mole of cyanometallate compound. In some cases, the M$^5$ metal- or semi-metal-containing precursor reacts during the catalyst preparation step. For example, the M$^5$ metal or semi-metal compounds may react with water during the catalyst preparation to form the corresponding metal or semi-metal oxide and/or metal hydroxide. The M$^5$ metal or semi-metal compounds or reaction product thereof (especially an M$^5$ metal or semi-metal oxide or hydroxide) in some embodiments forms, together with a reaction product of the M$^1$ metal compound and the cyanometallate compound, hybrid particles having an M$^1{}_b[M^2(CN)_r(X^1)_t]_c$ phase and an M$^5$ metal or semi-metal oxide or hydroxide phase.

A catalyst complex prepared in the presence of an M$^5$ metal or semi-metal compound (or precursor thereto) in some embodiments of the invention has the formula II:

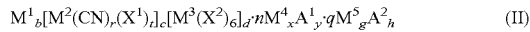

$$M^1{}_b[M^2(CN)_r(X^1)_t]_c[M^3(X^2)_6]_d \cdot nM^4{}_xA^1{}_y \cdot qM^5{}_gA^2{}_h \qquad (II)$$

wherein:
  M$^5$ represents one or more of gallium, hafnium, indium, aluminum, magnesium, manganese, scandium, molybdenum, cobalt, tungsten, iron, vanadium, tin, titanium, silicon and zinc;
  A$^2$ represents least one alkoxide, aryloxy, carboxylate, acyl, pyrophosphate, phosphate, thiophosphate, amide, oxide, siloxide, hydride, carbamate, halide or hydrocarbon anion;
  p and q each are independently from 0.002 to 10;
  g and h are numbers that balance the charges in the metal salt M$^5{}_gA^2{}_h$, provided that w is from 1 to 4;
  and the remaining variables are as described above.

M$^5$ preferably includes at least one of gallium, hafnium, aluminum, manganese, magnesium and indium and may be a mixture of any two or more of gallium, hafnium, aluminum, manganese, magnesidum and indium or of any one or more of gallium, hafnium, aluminum and indium and any one or more of magnesium, manganese, scandium, molybdenum, cobalt, tungsten, iron, vanadium, tin, titanium, silicon and zinc.

The mole ratio of M$^5$ metal or semi-metal to M$^2$ and M$^3$ metals combined may be, for example, 0.002 to 10, as determined by X-ray fluorescence (XRF) methods. In some embodiments, this mole ratio is 0.05 to 10, 0.1 to 5, 0.1 to 2, or 0.25 to 1. It is noted that the ratios of metals in the catalyst complex may differ substantially from the ratios employed in the catalyst preparation process.

Formula (II) is not intended to denote any special crystalline form or other spatial or chemical relationship between the M$^1{}_b[M^2(CN)_r(X^1)_t]_c[M^3(X^2)_6]_d$, M$^4{}_xA^1{}_y$ and M$^5{}_gA^2{}_h$ components of the catalyst complex. In some embodiments the catalyst complex comprises hybrid particles having an M$^1{}_b[M^2(CN)_r(X^1)_t]_c$ phase and an M$^5{}_gA^2{}_h$ phase. The M$^4{}_xA^1{}_y$ phase, when present, is believed to reside at least partially on particles of the M$^1{}_b[M^2(CN)_r(X^1)_t]_c$ phase. In addition to such hybrid particles, the catalyst complex may contain particles of the M$^1{}_b[M^2(CN)_r(X^1)_t]_c$ phase or of an M$^1{}_b[M^2(CN)_r(X^1)_t]_c[M^3(X^2)_6]_d \cdot nM^4{}_xA^1{}_y$ phase only, and other particles of the M$^4{}_xA^1{}_y$ phase only.

The water-insoluble polymerization catalyst complex made in either of the foregoing processes contains 0.5 to 2.0 weight percent potassium. The ability to tolerate these somewhat large amounts of potassium in the process without large adverse affect on catalyst activity and performance is highly surprising. Because potassium does not need to be removed from the catalyst to very low levels, the catalyst preparation methods can be simplified. In particular, washing steps can be reduced or eliminated. Thus, in some embodiments of the invention, the catalyst complex, whether or not prepared in the presence of the M$^5$ metal or semi-metal compound, either is not washed at all after the precipitation step that produces the double metal cyanide compounds, or is washed at most once. A "wash" for purposes of this invention means a combining of the precipitated catalyst complex with at least an equal volume of water and/or solvent as described above, followed by separation of the water and/or solvent.

By "alkoxide" ion it is meant a species having the form $^-$O—R, where R is an alkyl group or substituted alkyl group, and which is the conjugate base, after removal of a hydroxyl hydrogen, of an alcohol compound having the form HO—R. These alcohols may have pKa values in the range of 13 to 25 or greater. The alkoxide ion in some embodiments may contain 1 to 20 (e.g., 1 to 6 and/or 2 to 6) carbon atoms. The alkyl group or substituted alkyl group may be linear, branched, and/or cyclic. Examples of suitable substituents include, e.g., additional hydroxyl groups (which may be in the alkoxide form), ether groups, carbonyl groups, ester groups, urethane groups, carbonate groups, silyl groups, aromatic groups such as phenyl and alkyl-substituted phenyl, and halogens. Examples of such alkoxide ions include methoxide, ethoxide, isopropoxide, n-propoxide, n-butoxide, sec-butoxide, t-butoxide, and benzyloxy. The R group may contain one or more hydroxyl groups and/or may contain one or more ether linkages. An alkoxide ion may correspond to the residue (after removal of one or more hydroxyl hydrogens) of a starter compound that is present in the polymerization, such as those starter compounds described below. The alkoxide ion may be an alkoxide formed by removing one or more hydroxyl hydrogens from a polyether monol or polyether polyol; such an alkoxide in some embodiments corresponds to a residue, after removal of one or more hydroxyl hydrogen atoms, of the polyether monol or polyether polyol product that is obtained from the alkoxylation reaction, or of a polyether having a molecular weight intermediate to that of the starter compound and the product of the alkoxylation reaction.

By "aryloxy" anion it is meant a species having the form ⁻O—Ar, where Ar is an aromatic group or substituted aromatic group, and which corresponds, after removal of a hydroxyl hydrogen, to a phenolic compound having the form HO—Ar. These phenolic compounds may have a pKa of, e.g., 9 to about 12. Examples of such aryloxy anions include phenoxide and ring-substituted phenoxides, in which the ring-substituents include, e.g., one or more of alkyl, $CF_3$, cyano, $COCH_3$, halogen, hydroxyl, and alkoxyl. The ring-substituent(s), if present, may be in one or more of the ortho-, para- and/or meta-positions relative to the phenolic group. The phenoxide anions also include the conjugate bases of polyphenolic compounds such as bisphenol A, bisphenol F and various other bisphenols, 1,1,1-tris(hydroxyphenyl)ethane, and fused ring aromatics such as 1-naphthol.

By "carboxylate" anion it is meant a carboxylate that contains 1 to 24 (e.g., 2 to 18 and/or 2 to 12) carbon atoms. The carboxylate may be aliphatic or aromatic. An aliphatic carboxylic acid may contain substituent groups. Examples of such include hydroxyl groups (which may be in the alkoxide form), ether groups, carbonyl groups, ester groups, urethane groups, carbonate groups, silyl groups, aromatic groups such as phenyl and alkyl-substituted phenyl, and halogens. Examples of aliphatic carboxylate anions include formate, acetate, propionate, butyrate, 2-ethylhexanoate, n-octoate, decanoate, laurate and other alkanoates and halogen-substituted alkanoates such as 2,2,2-trifluoroacetate, 2-fluoroacetate, 2,2-difluoroacetate, 2-chloroacetate, and 2,2,2-trichloroacetate. Examples of aromatic carboxylates include benzoate, alkyl-substituted benzoate, halo-substituted benzoate, 4-cyanobenzoate, 4-trifluoromethylbenzoate, salicylate, 3,5-di-t-butylsalicylate, and subsalicylate. In some embodiments, such a carboxylate ion may be the conjugate base of a carboxylic acid having a pKa 1 to 6 (e.g., 3 to 5).

By "acyl" anion it is meant a conjugate base of a compound containing a carbonyl group including, e.g., an aldehyde, ketone, acetylacetonate, carbonate, ester or similar compound that has an enol form. Examples of these are 13-diketo compounds, such as acetoacetonate and butylacetoacetonate.

By "phosphate" anion it is meant a phosphate anion that has the formula —O—P(O)(OR$^1$)$_2$, wherein R$^1$ is alkyl, substituted alkyl, phenyl, or substituted phenyl. By "thiophosphate" anion it is meant thiophosphate anions have the corresponding structure in which one or more of the oxygens are replaced with sulfur. The phosphate and thiophosphates may be ester anions, such as phosphate ester and thiophosphate ester.

By "pyrophosphate" anion it is meant the $P_2O_7^{4-}$ anion.

By "amide" anion it is meant an ion in which a nitrogen atom bears a negative charge. The amide ion generally takes the form —N(R$^2$)$_2$, wherein the R$^2$ groups are independently hydrogen, alkyl, aryl, trialkylsilyl, or triarylsilyl. The alkyl groups may be linear, branched, or cyclic. Any of these groups may contain substituents such as ether or hydroxyl. The two R$^2$ groups may together form a ring structure, which ring structure may be unsaturated and/or contain one or more heteroatoms (in addition to the amide nitrogen) in the ring.

By "oxide" anion is meant the anion of atomic oxygen, i.e., $O^{2-}$.

By "siloxide" anion it is meant silanoates having the formula (R$^3$)$_3$SiO—, wherein R$^3$ groups are independently hydrogen or alkyl group.

By "hydride" anion it is meant the anion of hydrogen, i.e., H—.

By "carbamate" anion it is meant the anion —OOCNH$_2$.

By "hydrocarbon" anion it is meant hydrocarbyl anions that include aliphatic, cycloaliphatic and/or aromatic anions wherein the negative charge resides on a carbon atom. The hydrocarbyl anions are conjugate bases of hydrocarbons that typically have pKa values in excess of 30. The hydrocarbyl anions may also contain inert substituents. Of the aromatic hydrocarbyl anions, phenyl groups and substituted phenyl groups may be used. Aliphatic hydrocarbyl anions may be alkyl groups which may contain, for example, 1 to 12 (e.g., 2 to 8) carbon atoms. For example, methyl, ethyl, n-propyl, isopropyl, n-butyl, sec-butyl, isobutyl, cyclopentadienyl and t-butyl anions are all useful.

By "halide" anion it is meant F⁻, Cl⁻, Br⁻ and I⁻.

Examples of useful gallium compounds include trialkyl gallium compounds such as trimethylgallium, triethyl gallium, tributyl gallium, tribenzylgallium and the like; gallium oxide; gallium alkoxides such as gallium trimethoxide, gallium triethoxide, gallium triisopropoxide, gallium tri-t-butoxide, gallium tri-sec-butoxide and the like; gallium aryloxides such as gallium phenoxide and gallium phenoxides in which one or more of the phenoxide groups is ring-substituted with one or more of alkyl, $CF_3$, cyano, $COCH_3$, halogen, hydroxyl, alkoxyl and the like; gallium carboxylates such as gallium formate, gallium acetate, gallium propionate, gallium 2-ethylhexanoate, gallium benzoate, gallium benzoates in which one or more of the benzoate groups is ring-substituted with one or more of alkyl, $CF_3$, cyano, $COCH_3$, halogen, hydroxyl, alkoxyl and the like, gallium salicylate, gallium 3,5-di-t-butyl salicylate; gallium amides such as gallium tris(dimethylamide), gallium tris(diethylamide), gallium tris(diphenylamide), gallium tris(di(trimethylsilyl)amide) and the like; gallium acetylacetonate; gallium t-butylacetylacetonate; and alkylgallium alkoxides such as diethylgallium ethoxide, dimethylgallium ethoxide, diethylgallium isopropoxide and dimethylgallium isopropoxide.

Examples of useful hafnium compounds include hafnium alkyls such as such as tetraethyl hafnium, tetrabutyl hafnium, tetrabenzyl hafnium and the like; hafnium oxide; hafnium alkoxides such as hafnium tetramethoxide, hafnium tetraethoxide, hafnium tetraisopropoxide, hafnium tetra-t-butoxide, hafnium tetra-sec-butoxide and the like; hafnium aryloxides such as hafnium phenoxide and hafnium phenoxides in which one or more of the phenoxide groups is ring-substituted with one or more of alkyl, $CF_3$, cyano, $COCH_3$, halogen, hydroxyl, alkoxyl and the like; hafnium carboxylates such as hafnium formate, hafnium acetate, hafnium propionate, hafnium 2-ethylhexanoate, hafnium benzoate, hafnium benzoates in which one or more of the benzoate groups is ring-substituted with one or more of alkyl, $CF_3$, cyano, $COCH_3$, halogen, hydroxyl, alkoxyl and the like, hafnium salicylate, hafnium 3,5-di-t-butyl salicylate; hafnium amides such as hafnium tetra(dimethylamide), hafnium tetra(diethylamide), hafnium tetra(diphenylamide), hafnium tetra((bistrimethylsilyl)amide); hafnium acetylacetonate and hafnium t-butylacetylacetonate.

Examples of useful indium compounds include trialkyl indium compounds like trimethyl indium; indium oxide; indium alkoxides such as indium methoxide, indium ethoxide, indium isopropoxide, indium t-butoxide, indium sec-butoxide and the like; indium aryloxides such as indium phenoxide and indium phenoxides in which one or more of the phenoxide groups is ring-substituted with one or more of alkyl, $CF_3$, cyano, $COCH_3$, halogen, hydroxyl, alkoxyl and the like; indium carboxylates such as indium formate, indium acetate, indium propionate, indium 2-ethylhexanoate, indium benzoate, indium benzoates in which one or more of the benzoate groups is ring-substituted with one or more of alkyl, $CF_3$, cyano, $COCH_3$, halogen, hydroxyl, alkoxyl and the like, indium salicylate, indium 3,5-di-t-butyl salicylate; indium acetylacetonate; and indium t-butylacetylacetonate.

Examples of useful aluminum compounds include trialkyl aluminum compounds such as trimethylaluminum, triethyl aluminum, tributyl aluminum, tribenzylaluminum and the like; aluminum alkoxides such as aluminum trimethoxide, aluminum triethoxide, aluminum triisopropoxide, aluminum tri-t-butoxide, aluminum tri-sec-butoxide and the like; aluminum aryloxides such as aluminum phenoxide and aluminum phenoxides in which one or more of the phenoxide groups is ring-substituted with one or more of alkyl, $CF_3$, cyano, $COCH_3$, halogen, hydroxyl, alkoxyl and the like; aluminum oxide; aluminum carboxylates such as aluminum formate, aluminum acetate, aluminum propionate, aluminum 2-ethylhexanoate, aluminum benzoate, aluminum benzoates in which one or more of the benzoate groups is ring-substituted with one or more of alkyl, $CF_3$, cyano, $COCH_3$, halogen, hydroxyl, alkoxyl and the like, aluminum salicylate, aluminum 3,5-di-t-butyl salicylate; aluminum amides such as aluminum tris(dimethylamide), aluminum tris(diethylamide), aluminum tris(diphenylamide), aluminum tris(di(trimethylsilyl)amide) and the like; aluminum acetylacetonate; aluminum t-butylacetylacetonate; and alkylaluminum oxides and alkoxides such as diethylaluminum ethoxide, dimethylaluminum ethoxide, diethylaluminum isopropoxide, dimethylaluminum isopropoxide, methyl aluminoxane, tetraethyldialuminoxane and the like.

Examples of useful magnesium compounds include magnesium alkyls such as diethyl magnesium, dibutyl magnesium, butylethyl magnesium, dibenzyl magnesium and the like; magnesium alkoxides such as magnesium methoxide, magnesium ethoxide, magnesium isopropoxide, magnesium t-butoxide, magnesium sec-butoxide and the like; magnesium aryloxides such as magnesium phenoxide, and magnesium phenoxides in which one or more of the phenoxide groups is ring-substituted with one or more of alkyl, $CF_3$, cyano, $COCH_3$, halogen, hydroxyl, alkoxyl and the like; magnesium carboxylates such as magnesium formate, magnesium acetate, magnesium propionate, magnesium 2-ethylhexanoate, magnesium benzoate, magnesium benzoates in which one or more of the benzoate groups is ring-substituted with one or more of alkyl, $CF_3$, cyano, $COCH_3$, halogen, hydroxyl, alkoxyl and the like, magnesium salicylate, magnesium 3,5-di-t-butyl salicylate; magnesium amides such as magnesium dimethylamide, magnesium diethylamide, magnesium diphenylamide, magnesium bis(trimethylsilyl)amide and the like; magnesium oxide, magnesium acetylacetonate and magnesium t-butylacetylacetonate Examples of useful manganese compounds include Mn(II) and/or Mn(III) and/or Mn(IV) compounds include manganese phosphate; pyrophosphate, manganese oxide; manganese alkoxides such as manganese methoxide, manganese ethoxide, manganese isopropoxide, manganese t-butoxide, manganese sec-butoxide and the like; manganese aryloxides such as manganese phenoxide and manganese phenoxides in which one or more of the phenoxide groups is ring-substituted with one or more of alkyl, $CF_3$, cyano, $COCH_3$, halogen, hydroxyl, alkoxyl and the like; manganese carboxylates such as manganese formate, manganese acetate, manganese propionate, manganese 2-ethylhexanoate, manganese benzoate, manganese benzoates in which one or more of the benzoate groups is ring-substituted with one or more of alkyl, $CF_3$, cyano, $COCH_3$, halogen, hydroxyl, alkoxyl and the like, manganese salicylate, manganese 3,5-di-t-butyl salicylate; manganese acetylacetonate; and manganese t-butylacetylacetonate.

Examples of useful scandium compounds include scandium alkoxides such as scandium methoxide, scandium ethoxide, scandium isopropoxide, scandium t-butoxide, scandium sec-butoxide and the like; scandium oxide; scandium aryloxides such as scandium phenoxide and scandium phenoxides in which one or more of the phenoxide groups is ring-substituted with one or more of alkyl, $CF_3$, cyano, $COCH_3$, halogen, hydroxyl, alkoxyl and the like; scandium carboxylates such as scandium formate, scandium acetate, scandium propionate, scandium 2-ethylhexanoate, scandium benzoate, scandium benzoates in which one or more of the benzoate groups is ring-substituted with one or more of alkyl, $CF_3$, cyano, $COCH_3$, halogen, hydroxyl, alkoxyl and the like; scandium salicylate; scandium acetylacetonate and scandium t-butylacetylacetonate.

Examples of useful molybdenum compounds include Mo(IV) and/or Mo(VI) compounds such as molybdenum phosphate; molybdenum pyrophosphate, molybdenum oxide; molybdenum alkoxides such as molybdenum methoxide, molybdenum ethoxide, molybdenum isopropoxide, molybdenum t-butoxide, molybdenum sec-butoxide and the like; molybdenum aryloxides such as molybdenum phenoxide and molybdenum phenoxides in which one or more of the phenoxide groups is ring-substituted with one or more of alkyl, $CF_3$, cyano, $COCH_3$, halogen, hydroxyl, alkoxyl and the like; molybdenum carboxylates such as molybdenum formate, molybdenum acetate, molybdenum propionate, molybdenum 2-ethylhexanoate, molybdenum benzoate, molybdenum benzoates in which one or more of the benzoate groups is ring-substituted with one or more of alkyl, $CF_3$, cyano, $COCH_3$, halogen, hydroxyl, alkoxyl and the like, molybdenum salicylate, molybdenum 3,5-di-t-butyl salicylate; molybdenum acetylacetonate.

Examples of useful cobalt compounds include Co (II) and/or Co(III) compounds such as cobalt phosphate; cobalt pyrophosphate, cobalt oxide; cobalt alkoxides such as cobalt methoxide, cobalt ethoxide, cobalt isopropoxide, cobalt t-butoxide, cobalt sec-butoxide and the like; cobalt aryloxides such as cobalt phenoxide and cobalt phenoxides in which one or more of the phenoxide groups is ring-substituted with one or more of alkyl, $CF_3$, cyano, $COCH_3$, halogen, hydroxyl, alkoxyl and the like; cobalt carboxylates such as cobalt formate, cobalt acetate, cobalt propionate, cobalt 2-ethylhexanoate, cobalt benzoate, cobalt benzoates in which one or more of the benzoate groups is ring-substituted with one or more of alkyl, $CF_3$, cyano, $COCH_3$, halogen, hydroxyl, alkoxyl and the like, cobalt salicylate, cobalt 3,5-di-t-butyl salicylate; cobalt acetylacetonate; and cobalt t-butylacetylacetonate, in each case being a Co(II) and/or Co(III) compound.

Examples of useful tungsten compounds include tungsten phosphate; tungsten pyrophosphate, tungsten oxide; tungsten alkoxides such as tungsten methoxide, tungsten ethoxide, tungsten isopropoxide, tungsten t-butoxide, tungsten sec-butoxide and the like; tungsten aryloxides such as tungsten phenoxide and tungsten phenoxides in which one or more of the phenoxide groups is ring-substituted with one or more of alkyl, $CF_3$, cyano, $COCH_3$, halogen, hydroxyl, alkoxyl and the like; tungsten carboxylates such as tungsten formate, tungsten acetate, tungsten propionate, tungsten 2-ethylhexanoate, tungsten benzoate, tungsten benzoates in which one or more of the benzoate groups is ring-substituted with one or more of alkyl, $CF_3$, cyano, $COCH_3$, halogen, hydroxyl, alkoxyl and the like, tungsten salicylate, tungsten 3,5-di-t-butyl salicylate; tungsten acetylacetonate; and tungsten t-butylacetylacetonate.

Examples of useful iron compounds include iron (II) and/or iron (III) compounds such as iron phosphate; iron pyrophosphate, iron oxide; iron alkoxides such as iron methoxide, iron ethoxide, iron isopropoxide, iron t-butoxide, iron sec-butoxide and the like; iron aryloxides such as iron phenoxide and iron phenoxides in which one or more of the phenoxide groups is ring-substituted with one or more of alkyl, $CF_3$, cyano, $COCH_3$, halogen, hydroxyl, alkoxyl and the like; iron carboxylates such as iron formate, iron acetate, iron propionate, iron 2-ethylhexanoate, iron benzoate, iron benzoates in which one or more of the benzoate groups is ring-substituted with one or more of alkyl, $CF_3$, cyano, $COCH_3$, halogen, hydroxyl, alkoxyl and the like, iron salicylate, iron 3,5-di-t-butyl salicylate; iron acetylacetonate; and iron t-butylacetylacetonate, in each case being a Fe(II) and/or Fe(III) compound.

Examples of useful vanadium compounds include vanadium alkoxides such as vanadium methoxide, vanadium ethoxide, vanadium isopropoxide, vanadium t-butoxide, vanadium sec-butoxide and the like; vanadium oxide; vanadium oxo tris(alkoxides) such as vanadium oxo tris(methoxide), vanadium oxo tris(ethoxide), vanadium oxo tris(isopropoxide), vanadium oxo tris(t-butoxide), vanadium oxo tris(sec-butoxide) and the like; vanadium aryloxides such as vanadium phenoxide and vanadium phenoxides in which one or more of the phenoxide groups is ring-substituted with one or more of alkyl, $CF_3$, cyano, $COCH_3$, halogen, hydroxyl, alkoxyl and the like; vanadium carboxylates such as vanadium formate, vanadium acetate, vanadium propionate, vanadium 2-ethylhexanoate, vanadium benzoate, vanadium benzoates in which one or more of the benzoate groups is ring-substituted with one or more of alkyl, $CF_3$, cyano, $COCH_3$, halogen, hydroxyl, alkoxyl and the like, vanadium salicylate, vanadium 3,5-di-t-butyl salicylate; vanadium tris(acetylacetonate) and vanadium tris(t-butylacetylacetonate); vanadium oxo bis(acetylacetonate).

Examples of useful tin compounds include stannous phosphate; stannous pyrophosphate, stannous oxide; stannic oxide; stannous alkoxides such as stannous methoxide, stannous ethoxide, stannous isopropoxide, stannous t-butoxide, stannous sec-butoxide and the like; stannous aryloxides such as stannous phenoxide and stannous phenoxides in which one or more of the phenoxide groups is ring-substituted with one or more of alkyl, $CF_3$, cyano, $COCH_3$, halogen, hydroxyl, alkoxyl and the like; stannous carboxylates such as stannous formate, stannous acetate, stannous propionate, stannous 2-ethylhexanoate, stannous benzoate, stannous benzoates in which one or more of the benzoate groups is ring-substituted with one or more of alkyl, $CF_3$, cyano, $COCH_3$, halogen, hydroxyl, alkoxyl and the like, stannous salicylate, stannous 3,5-di-t-butyl salicylate; stannous acetylacetonate; and stannous t-butylacetylacetonate.

Examples of useful zinc compounds include zinc alkyls such as such as dimethyl zinc, diethyl zinc, dibutyl zinc, dibenzyl zinc and the like; zinc oxide; alkyl zinc alkoxides such as ethyl zinc isopropoxide; zinc alkoxides such as zinc methoxide, zinc ethoxide, zinc isopropoxide, zinc t-butoxide, zinc sec-butoxide and the like; zinc aryloxides such as zinc phenoxide and zinc phenoxides in which one or more of the phenoxide groups is ring-substituted with one or more of alkyl, $CF_3$, cyano, $COCH_3$, halogen, hydroxyl, alkoxyl and the like; zinc carboxylates such as zinc formate, zinc acetate, zinc propionate, zinc 2-ethylhexanoate, zinc benzoate, zinc benzoates in which one or more of the benzoate groups is ring-substituted with one or more of alkyl, $CF_3$, cyano, $COCH_3$, halogen, hydroxyl, alkoxyl and the like, zinc salicylate, zinc 3,5-di-t-butyl salicylate; zinc amides such as zinc dimethylamide, zinc diethylamide, zinc diphenylamide, zinc (bistrimethylsilyl)amide; zinc acetylacetonate and zinc t-butylacetylacetonate.

Examples of useful titanium compounds include titanium dioxide and titanium alkoxides having the structure $Ti(OR)_4$ wherein R is alkyl or phenyl (which may be substituted), such as titanium tetraethoxide, titanium tetraisopropoxide, titanium tetra-t-butoxide, titanium tetra-sec-butoxide, titanium tetraphenoxide, titanium tetraphenoxides in which one or more of the phenoxide groups are independently ring-substituted with one or more of alkyl, $CF_3$, cyano, $COCH_3$, halogen, hydroxyl, alkoxyl and the like.

Examples of useful silicon compounds include silica and silicon alkoxides having the structure $Si(OR)_4$ wherein R is alkyl or phenyl (which may be substituted), such as silicon tetraethoxide, silicon tetraisopropoxide, silicon tetra-t-butoxide, silicon tetra-sec-butoxide, silicon tetraphenoxide, silicon tetraphenoxides in which one or more of the phenoxide groups are independently ring-substituted with one or more of alkyl, $CF_3$, cyano, $COCH_3$, halogen, hydroxyl, alkoxyl and the like.

Polyethers made in accordance with the invention may include monoalcohols such as are useful for surfactant and industrial solvent or lubricant applications, and polyols such as are useful raw materials for producing polymers such as polyurethanes such as molded foams, slabstock foams, high resiliency foams, viscoelastic foams, rigid foams, adhesives, sealants, coatings, elastomers, composites, etc.

The following examples are provided to illustrate exemplary embodiments and are not intended to limit the scope thereof. All parts and percentages are by weight unless otherwise indicated.

EXAMPLE 1

A. Preparation of Zinc Hexacyanocobaltate Catalysts Having Varying Potassium Concentrations Step 1: An aqueous zinc chloride solution (228 g, 50 wt. % $ZnCl_2$) is added at 5 mL/min with stirring to 523.5 g of an aqueous solution containing 2.1% potassium hexacyanocobaltate and 11.2% t-butanol. A 4000 number average molecular weight polypropylene oxide diol (2.8 g) is then added. The process temperature is controlled at 30° C.

Step 2: A solid precipitate forms that is recovered using a centrifuge. A portion of the resulting cake is dried in an oven at 50° C. to constant weight, crushed and sieved to produce a polymerization catalyst complex designated DMC-1. DMC-1 contains 1.9% potassium.

Step 3: A second portion of the cake from the centrifuging step is re-slurried in an aqueous solution containing 49.7% t-butanol and 0.65 of the polypropylene oxide diol. The solids are again separated using a centrifuge. A portion of the resulting wet cake is dried in an oven at 50° C. to constant weight, crushed and sieved to produce catalyst complex DMC-2. DMC-2 contains 0.63% potassium.

Step 4: The remaining portion of the wet cake from step 3 is re-slurried in an aqueous solution containing 64.4% t-butanol and 1.0% of the polypropylene oxide. The solids are again separated by centrifuging. A portion of the resulting cake is dried in an oven at 50° C. to constant weight, crushed and sieved to produce a polymerization catalyst complex designated DMC-3. DMC-3 contains 0.23% potassium.

Step 5: The remaining wet cake from Step 4 is re-slurried in a solution of 90.9% t-butanol, 0.6 wt. % of the polypropylene oxide diol and 8.5% water. The solids are once again recovered by centrifuging. The resulting cake is dried, crushed and sieved as before to produce polymerization catalyst DMC-4. DMC-4 contains 0.3% potassium.

DMC-5 is a zinc hexacyanocobaltate catalyst complex available commercially as Arcol®-3 catalyst. It contains 0.16% potassium.

B. General Procedure for Evaluation of the Polymerization Catalyst Complexes Catalyst activity is evaluated using a high throughput Symyx Technologies Parallel Pressure Reactor (PPR) reactor.

Starter formulations are prepared by combining 30 g of 700 molecular weight polypropylene oxide triol, 15 milligrams of the catalyst complex and additives as indicated below. The starter formulations are pretreated by heating at 130° C. for 30 minutes while stirring and sparging with nitrogen. The pretreated formulations are cooled to room temperature.

0.7 milliliter of starter formulation is transferred into a pre-weighed glass reactor vial. The filled vials are heated to 125° C. for at least 12 hours, and then are loaded into a well of the PPR reactor. The wells are sealed, pressurized to about 50 psig (345 kPa) with nitrogen and heated to 160° C. with stirring. 1 mL of propylene oxide is added to each reactor well. Pressure is monitored as an indication of catalyst activity. If active polymerization is taking place, the reactor pressure will decrease over time because propylene oxide is consumed. If pressure drops below 190 psi (1310 kPa) within one hour, a second 1 mL aliquot of propylene oxide is added, followed by a third 1 mL aliquot an hour later, if the pressure has again dropped below 190 psig (1310 kPa). The reaction is then maintained at the reaction temperature for a total run time of 4 hours.

C. Comparative Samples A-E

The activity of each of catalyst complexes DMC-1 through DMC-5 are evaluated according to the foregoing general procedure. Each run is replicated three times. Results are indicated in Table 1.

TABLE 1

| Activity of DMC catalysts without additives | | | | | |
|---|---|---|---|---|---|
| Sample Designation | Comp. A | Comp. B | Comp. C | Comp. D | Comp. E |
| Catalyst | DMC-1 | DMC-2 | DMC-3 | DMC-4 | DMC-5 |
| Potassium content, wt.-% | 1.9 | 0.63 | 0.23 | 0.30 | 0.16 |
| Result | No activity | No activity | Moderate activity | Moderate activity | Moderate, inconsistent activity |

These results demonstrate the effect of potassium on catalyst activity. When the potassium content is low, as in Samples C, D and E, the catalyst is moderately active even in the absence of any performance-improving additive. Samples C and D each exhibit a decrease in reactor pressure after all three propylene oxide additions, although the rate of decrease (which indicates rate of polymerization and therefore catalyst activity) is in some cases gradual. Sample E performs inconsistently under these conditions, failing to activate at all on at least one of the replicate runs. When the potassium level increases as in Samples A and B, even this moderate activity is lost.

D. Comparative Samples F-J

In this series of experiments, phosphoric acid (0.154 mg/mL) is added to the starting formulation prior to performing the general procedure described in B above. Results are as indicated in Table 2.

TABLE 2

| Activity of DMC catalysts in the presence of $H_3PO_4$ | | | | | |
|---|---|---|---|---|---|
| Sample Designation | Comp. F | Comp. G | Comp. H | Comp. I | Comp. J |
| Catalyst | DMC-1 | DMC-2 | DMC-3 | DMC-4 | DMC-5 |
| Potassium content, wt.-% | 1.9 | 0.63 | 0.23 | 0.30 | 0.16 |
| Result | Poor activity followed by deactivation | Good activity followed by deactivation | Good initial activity falling to poor | Excellent activity | Excellent activity |

Phosphoric acid is known to improve the performance of DMC catalysts. These results show that phosphoric acid is effecting in improving DMC catalyst performance (compared to that of the catalyst by itself) when the potassium concentration is low. Thus Comp. H performs better than Comp. C, Comp. I, performs better than Comp D, and Comp. J performs better than Comp. E. In each of Comp. H, I and J, adequate to good performance is attained through adding phosphoric acid.

Different results are obtained when the potassium concentration is higher, as in Comp. F and Comp. G. There, the performance of the catalyst is improved (Comp. F vs. Comp A. and Comp. G vs. Comp. B) but remains unsatisfactory.

E. Examples 1-2 and Comparative Samples K-M

In this series of experiments, aluminum isopropoxide (4.556 mg/mL) is added to the starting formulation prior to performing the general procedure described in B above. Results are as indicated in Table 3.

TABLE 3

Activity of DMC catalysts in the presence of aluminum isopropoxide

| Sample Designation | Ex. 1 | Ex. 2 | Comp. K | Comp. L | Comp. M |
|---|---|---|---|---|---|
| Catalyst | DMC-1 | DMC-2 | DMC-3 | DMC-4 | DMC-5 |
| Potassium content, wt.-% | 1.9 | 0.63 | 0.23 | 0.30 | 0.16 |
| Result | Very good initial activity falling to moderate | Excellent Activity | Excellent Activity | Excellent activity | Excellent activity |

These results show that the performance of all the catalysts is improved by adding the aluminum isopropoxide. Notably, even the performances of DMC-1 and DMC-2 are quite good, contrary to the case in which no additive or phosphoric acid was present. Example 1 indicates that the benefit of the invention is seen at potassium concentrations of up to about 2% in the catalyst complex; at this level of potassium, the addition of aluminum isopropoxide is not quite as effective when the potassium content is up to about 0.63%. 0.63% potassium is not only tolerated; the adverse effects of the higher potassium content are entirely overcome by the presence of the aluminum isopropoxide.

As these results show, this invention permits a simplification of the catalyst preparation. Less washing (fewer steps and/or less stringent conditions) is necessary because it is not necessary to scrupulously remove potassium to very low levels. DMC-1, which is washed only a single time with only partial potassium removal, performs well in accordance with this invention.

F. Examples 3-4 and Comparative Samples N-P

In this series of experiments, aluminum sec-butoxide (4.556 mg/mL) is added to the starting formulation prior to performing the general procedure described in B above. Results are as indicated in Table 4.

TABLE 4

Activity of DMC catalysts in the presence of aluminum sec-butoxide

| Sample Designation | Ex. 3 | Ex. 4 | Comp. N | Comp. O | Comp. P |
|---|---|---|---|---|---|
| Catalyst | DMC-1 | DMC-2 | DMC-3 | DMC-4 | DMC-5 |
| Potassium content, wt.-% | 1.9 | 0.63 | 0.23 | 0.30 | 0.16 |
| Result | Very good initial activity falling to moderate | Excellent Activity | Excellent Activity | Excellent activity | Excellent activity |

The results shown in Table 4 show that similar results are obtained using aluminum sec-butoxide instead of aluminum isopropoxide.

The invention claimed is:

1. A method for producing a polyether, the method comprising:
   I. forming a reaction mixture comprising a) a hydroxyl-containing starter, b) at least one alkylene oxide, c) a water insoluble polymerization catalyst complex that includes at least one double metal cyanide compound and d), as part of the water insoluble polymerization catalyst complex or as a separate component, at least one $M^5$ metal or semi-metal compound, in which the $M^5$ metal or semi-metal is selected from aluminum, magnesium, manganese, scandium, molybdenum, cobalt, tungsten, iron, vanadium, tin, titanium, silicon and zinc, and is bonded to at least one alkoxide, aryloxy, carboxylate, acyl, pyrophosphate, phosphate, thiophosphate, dithiophosphate, phosphate ester, thiophosphate ester, amide, oxide, siloxide, hydride, carbamate, halide or hydrocarbon anion, and
   II. polymerizing the alkylene oxide onto the hydroxyl-containing starter in the presence of the water insoluble polymerization catalyst complex and the $M^5$ metal or semi-metal compound to produce the polyether,
   wherein the water insoluble polymerization catalyst complex contains 0.5 to 2 weight percent potassium, based on the weight of the water insoluble polymerization catalyst complex, the water insoluble polymerization catalyst being prepared by a method comprising forming a starting solution containing zinc compound and a potassium cyanometallate compound in a solvent that includes water and a liquid aliphatic alcohol, and reacting the zinc compound and cyanometallate compound in the presence of the M5 metal compound to produce the double metal cyanide catalyst, which precipitates from solution, and washing the precipitated catalyst zero or one time with water and/or a liquid aliphatic alcohol.

2. The method of claim 1 wherein component d) is a separate component from the water insoluble polymerization catalyst complex and the double metal cyanide compound has the formula:

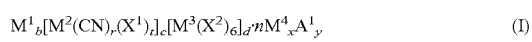

$$M^1{}_b[M^2(CN)_r(X^1)_t]_c[M^3(X^2)_6]_d \cdot nM^4{}_xA^1{}_y \quad (I)$$

wherein:
$M^1$ and $M^4$ each represent a metal ion independently selected from $Zn^{2+}$, $Fe^{2+}$, $Co^{+2+}$, $Ni^{2+}$, $Mo^{4+}$, $Mo^{6+}$, $Al^{+3+}$, $V^{4+}$, $V^{5+}$, $Sr^{2+}$, $W^{4+}$, $W^{6+}$, $Mn^{2+}$, $Sn^{2+}$, $Sn^{4+}$, $Pb^{2+}$, $Cu^{2+}$, $La^{3+}$, and $Cr^{3+}$;

$M^2$ and $M^3$ each represent a metal ion independently selected from $Fe^{3+}$, $Fe^{2+}$, $Co^{3+}$, $Co^{2+}$, $Cr^{2+}$, $Cr^{3+}$, $Mn^{2+}$, $Mn^{3+}$, $Ir^{3+}$, $Ni^{2+}$, $Rh^{3+}$, $Ru^{2+}$, $V^{4+}$, $V^{5+}$, $Ni^{2+}$, $Pd^{2+}$, and $Pt^{2+}$;

$X^1$ represents a group other than cyanide that coordinates with the $M^2$ ion;

$X^2$ represents a group other than cyanide that coordinates with the $M^3$ ion;

$A^1$ represents a halide, nitrate, sulfate, carbonate, cyanide, oxalate, thiocyanate, isocyanate, perchlorate, isothiocyanate, an alkanesulfonate, an arylenesulfonate, trifluoromethanesulfonate, or a $C_{1-4}$ carboxylate;

b, c and d are each numbers that reflect an electrostatically neutral complex, provided that b and c each are greater than zero;

x and y are integers that balance the charges in the metal salt $M^4{}_x A^1{}_y$;

r is an integer from 4 to 6;

t is an integer from 0 to 2; and n is a number from 0 and 20.

3. The method of claim 1 wherein component d) forms part of the water insoluble polymerization catalyst complex and the catalyst complex has the formula:

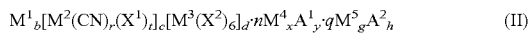  (II)

wherein:

$M^1$ and $M^4$ each represent a metal ion independently selected from $Zn^{2+}$, $Fe^{2+}$, $Co^{+2+}$, $Ni^{2+}$, $Mo^{4+}$, $Mo^{6+}$, $Al^{+3+}$, $V^{4+}$, $V^{5+}$, $Sr^{2+}$, $W^{4+}$, $W^{6+}$, $Mn^{2+}$, $Sn^{2+}$, $Sn^{4+}$, $Pb^{2+}$, $Cu^{2+}$, $La^{3+}$, and $Cr^{3+}$;

$M^2$ and $M^3$ each represent a metal ion independently selected from $Fe^{3+}$, $Fe^{2+}$, $Co^{3+}$, $Co^{2+}$, $Cr^{2+}$, $Cr^{3+}$, $Mn^{2+}$, $Mn^{3+}$, $Ir^{3+}$, $Ni^{2+}$, $Rh^{3+}$, $Ru^{2+}$, $V^{4+}$, $V^{5+}$, $Ni^{2+}$, $Pd^{2+}$, and $Pt^{2+}$;

$X^1$ represents a group other than cyanide that coordinates with the $M^2$ ion;

$X^2$ represents a group other than cyanide that coordinates with the $M^3$ ion;

$A^1$ represents a halide, nitrate, sulfate, carbonate, cyanide, oxalate, thiocyanate, isocyanate, perchlorate, isothiocyanate, an alkanesulfonate, an arylenesulfonate, trifluoromethanesulfonate, or a $C_{1-4}$ carboxylate;

b, c and d are each numbers that reflect an electrostatically neutral complex, provided that b and c each are greater than zero;

x and y are integers that balance the charges in the metal salt $M^4{}_x A^1{}_y$;

r is an integer from 4 to 6;

t is an integer from 0 to 2;

n is a number from 0 and 20;

$M^5$ represents one or more of gallium, hafnium, indium, aluminum, magnesium, manganese, scandium, molybdenum, cobalt, tungsten, iron, vanadium, tin, titanium, silicon and zinc;

$A^2$ represents least one alkoxide, aryloxy, carboxylate, acyl, pyrophosphate, phosphate, thiophosphate, amide, oxide, siloxide, hydride, carbamate, halide or hydrocarbon anion;

p and q each are independently from 0.002 to 10; and g and h are numbers that balance the charges in the metal salt $M^5{}_g A^2{}_h$, provided that w is from 1 to 4.

4. The method of claim 1 wherein the $M^5$ metal or semi-metal is selected from the group consisting of gallium, aluminum, hafnium, indium, manganese and magnesium.

5. The method of claim 1 which is a semi-batch process in which the catalyst complex and starter are charged to a reaction vessel, the catalyst complex is activated and at least a portion of the alkylene oxide is thereafter added to the reaction vessel containing the activated catalyst complex and starter under polymerization conditions without removal of product until all of the alkylene oxide has been added.

6. The method of claim 1 which is a continuous process in which the catalyst complex, starter and alkylene oxide are fed continuous to a reaction vessel under polymerization conditions and product is continuously removed from the reaction vessel.

7. The method of claim 1 wherein the starter has a hydroxyl equivalent weight of 30 to 200.

8. The method of claim 1 wherein the hydroxyl concentration during at least a portion of the polymerization is in the range of 4.25 to 20% by weight of the reaction mixture.

* * * * *